United States Patent [19]
Rao

[11] Patent Number: 5,435,546
[45] Date of Patent: Jul. 25, 1995

[54] COMBINED BAG AND TROLLEY, PARTICULARLY, A COMBINED GOLF BAG AND TROLLEY

[76] Inventor: Doddi L. Rao, Sinclair House, 72a Willoughby Lane, London, N17 OSF, United Kingdom

[21] Appl. No.: 133,065
[22] PCT Filed: Apr. 10, 1992
[86] PCT No.: PCT/GB92/00655
   § 371 Date: Oct. 12, 1993
   § 102(e) Date: Oct. 12, 1993
[87] PCT Pub. No.: WO92/18206
   PCT Pub. Date: Oct. 29, 1992

[30] Foreign Application Priority Data
   Apr. 11, 1991 [GB] United Kingdom ................. 9107706

[51] Int. Cl.⁶ .......................... A63B 57/00; B62B 1/04
[52] U.S. Cl. .................. 273/32 E; 206/315.4; 206/315.5; 280/40
[58] Field of Search .................. 273/32 E; 206/315.3, 206/315.4, 315.5; 280/41, 42

[56] References Cited

U.S. PATENT DOCUMENTS

| | | | |
|---|---|---|---|
| 2,438,078 | 3/1948 | Sutphen | 206/315.3 X |
| 2,837,346 | 6/1958 | Chambless | 280/37 |
| 2,914,336 | 11/1959 | Hibben et al. | 280/42 |
| 2,926,925 | 3/1960 | Ozlek | 280/42 |
| 3,014,732 | 12/1961 | Schemenauer | 280/41 |
| 4,844,493 | 6/1978 | Kramer | 180/169 |
| 5,112,068 | 5/1992 | Liao et al. | 206/315.3 X |

FOREIGN PATENT DOCUMENTS

| | | |
|---|---|---|
| 847275 | 9/1960 | United Kingdom |
| 2096546 | 10/1982 | United Kingdom |
| 2104017 | 3/1983 | United Kingdom |

*Primary Examiner*—William H. Grieb
*Attorney, Agent, or Firm*—Biebel & French

[57] ABSTRACT

A combined bag and trolley, particularly a golf bag and trolley, comprises an elongated bag and a collapsible trolley. The trolley comprises an undercarriage having a pair of foldable wheels. It is pivotally connected to the bag so that the undercarriage can be swiveled between an operative position, in which the wheel axes are transverse to the longitudinal axis of the bag so as to permit wheeling of the bag on the trolley, and an inoperative position in which the undercarriage and wheel axes are generally parallel to the longitudinal axis of the bag. In the inoperative position, the wheels are folded upwardly and the trolley is collapsed into and stowed in an adjacent cavity in the underside of the bag when not in use. The collapsing and deployment of the trolley may be controlled by a handle for propelling the bag on the trolley. This handle is pivoted to the bag and is connected to the trolley so as to collapse or deploy the trolley in response to pivotal lowering or raising of the handle.

20 Claims, 5 Drawing Sheets

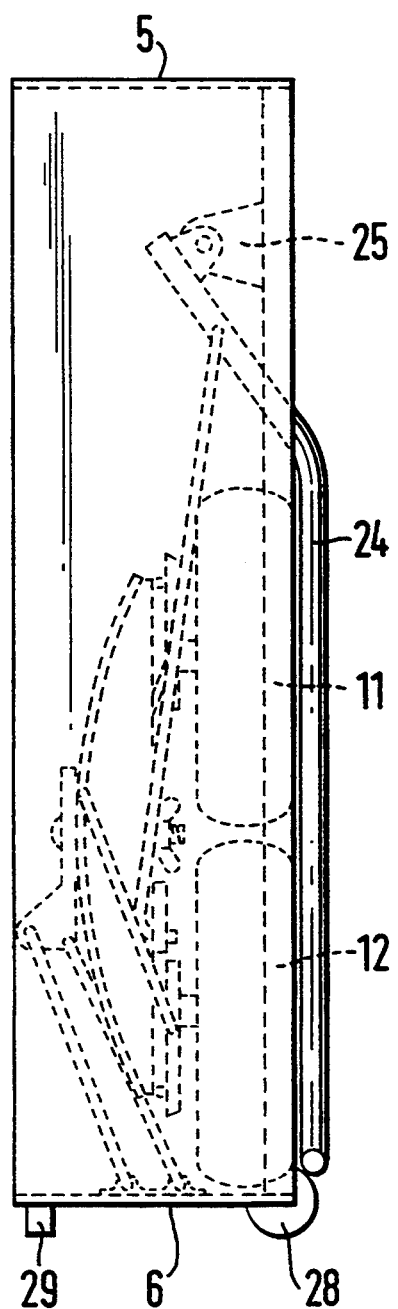
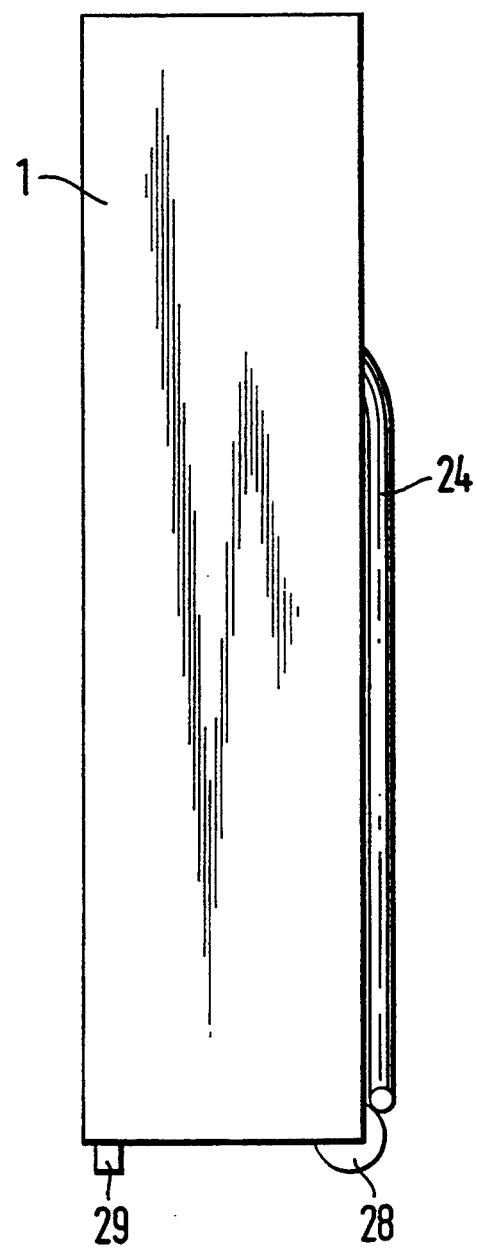
Fig. 3
Fig. 4

COMBINED BAG AND TROLLEY, PARTICULARLY, A COMBINED GOLF BAG AND TROLLEY

BACKGROUND OF THE INVENTION

The present invention relates to a combined bag and trolley and, more particularly, to such a combined unit in which the trolley wheels may be collapsed or folded away for convenience in storing and transporting the unit. The invention is especially designed for use as a combined golf bag and trolley but may also be constructed for use with other articles, for example, surfboards or sailboards.

On golf courses, golfers often transport their golf bags on trolleys, commonly referred to as caddy carts, to avoid the strain of having physically to carry the bags which, when loaded with a full set of golf clubs, can be heavy. Typically a caddy cart comprises a simple frame mounting a pair of wheels and having a handle. A golf bag is strapped to the frame so that it may be towed or pushed on the trolley by the golfer. The golf bag is normally removed from the caddy cart for the purposes of storage and transportation and, whilst caddy carts are available with collapsible frames and foldable wheels, they still tend to be cumbersome and awkward to transport together with golf bags, for example, in the boots of cars.

SUMMARY OF THE INVENTION

It is an object of the present invention to provide a combined bag and trolley, more especially, although not exclusively, a combined golf bag and trolley, in which the trolley of the combined unit, whilst remaining attached to the bag, may be collapsed or folded when not in use to facilitate storage and transportation of the combined unit.

The invention consists in a combined bag and trolley comprising an elongated bag and a trolley, in which the trolley comprises an undercarriage mounting a pair of wheels and is attached to the bag via a pivotal connection, whereby the undercarriage can be swiveled between an operative position in which the wheel axes are transverse to the longitudinal axis of the bag and an inoperative position in which they are disposed substantially in a plane containing said longitudinal axis, said wheels being foldable, when not in use, into positions such that their planes are substantially parallel to the undercarriage, characterised by a cavity or recess located in the side of the bag adjacent the trolley and in which the undercarriage and folded wheels are stowed when the undercarriage is swiveled into its inoperative position, said cavity or recess being sufficiently deep so as to house the undercarriage and folded wheels substantially within the confines of the bag.

In one preferred embodiment, the bag includes spaced longitudinally extending frame members extending along opposite sides of the cavity or recess, and the undercarriage is movable into the cavity or recess between these frame members. The combined bag and trolley preferably includes a handle which is pivotally connected to a pivotal strut assembly, the strut assembly being arranged such that pivotally lifting the handle deploys the undercarriage out of the cavity or recess, swivels the undercarriage to its operative position, and unfolds the wheels, and pivotally lowering the handle reverses the procedure to re-stow the undercarriage in the cavity or recess. A latching mechanism may be provided to latch the handle in its pivotally lifted position, so as to retain the undercarriage securely in its operative position.

The pivotal strut assembly may include one or more struts coupling the undercarriage to the bag and extending in the longitudinal direction of the bag and swingable in a direction transverse to the bag axis so as to move with the undercarriage as the latter is moved into and out of the cavity, the undercarriage being pivotally connected to the strut or struts. Preferably, the strut or struts are spring-biassed about their pivotal connections so as to provide a force effective to push the undercarriage out of the cavity. The strut or struts may be pivotally connected to a plate member to which the undercarriage is pivotally connected.

Conveniently, the undercarriage comprises an arch-shaped wheel brace and the wheels are attached to opposite ends of the brace by hinged legs so that they can be folded inwardly to be positioned substantially parallel to the underside of the brace.

The invention is particularly suitable for use as a combined golf bag and trolley or caddy cart. In such an embodiment, the bag may have an open upper end provided with a projecting handle and the undercarriage may be mounted adjacent the closed lower end of the bag so that when the undercarriage and wheels are deployed, the bag, when not being wheeled, will be supported, by a tripod arrangement formed by the lower end of the bag and the two wheels, in a generally upright position providing ready access to the clubs projecting from the open upper end of the bag. The upper end of the bag may be provided with a hinged lid or cover for closing the upper end of the bag and protecting the golf clubs. When open, the lid may be used for carrying items of clothing, golf balls, etc.

The pivotal connection of the undercarriage to the bag may be arranged to be releasable so that the undercarriage and wheels can be detached from the bag and the bag may be provided with a shoulder strap so that, in the event the undercarriage is detached, the bag can be carried in the conventional way. The cavity or recess for receiving the undercarriage and wheels may be provided with a closable cover, for example, actuated by a zip fastener, so that it can be used as a storage compartment for carrying personal items or other golfing accessories.

The combined unit may be motor driven instead of manually propelled. To this end, the unit may be furnished with one or more electrical motors suitably coupled to drive one or both wheels and a rechargeable battery or accumulator as a source of electrical power for the motor. In a particular embodiment, a small motor may be mounted on each wheel and the motors may be independently controlled.

Whilst the term "bag" is used herein, it will be understood that the invention is not limited to a combined unit in which the receptacle for carrying items has flexible walls. On the contrary, the receptacle may be a box-like item having rigid walls or a receptacle having a combination of rigid and flexible walls. Hence, in this specification, the term "bag" is intended generally to connote a bag, box or other receptacle construction.

In order that the present invention may be more readily understood, reference will now be made to the accompanying drawings, in which:

BRIEF DESCRIPTION OF THE DRAWINGS

FIG. 3 is a side elevation of the embodiment illustrating the trolley in its stowed position, FIG. 4 is a side elevation similar to FIG. 3 and omitting interior details of the bag.

DESCRIPTION OF THE PREFERRED EMBODIMENTS

Figure 1:
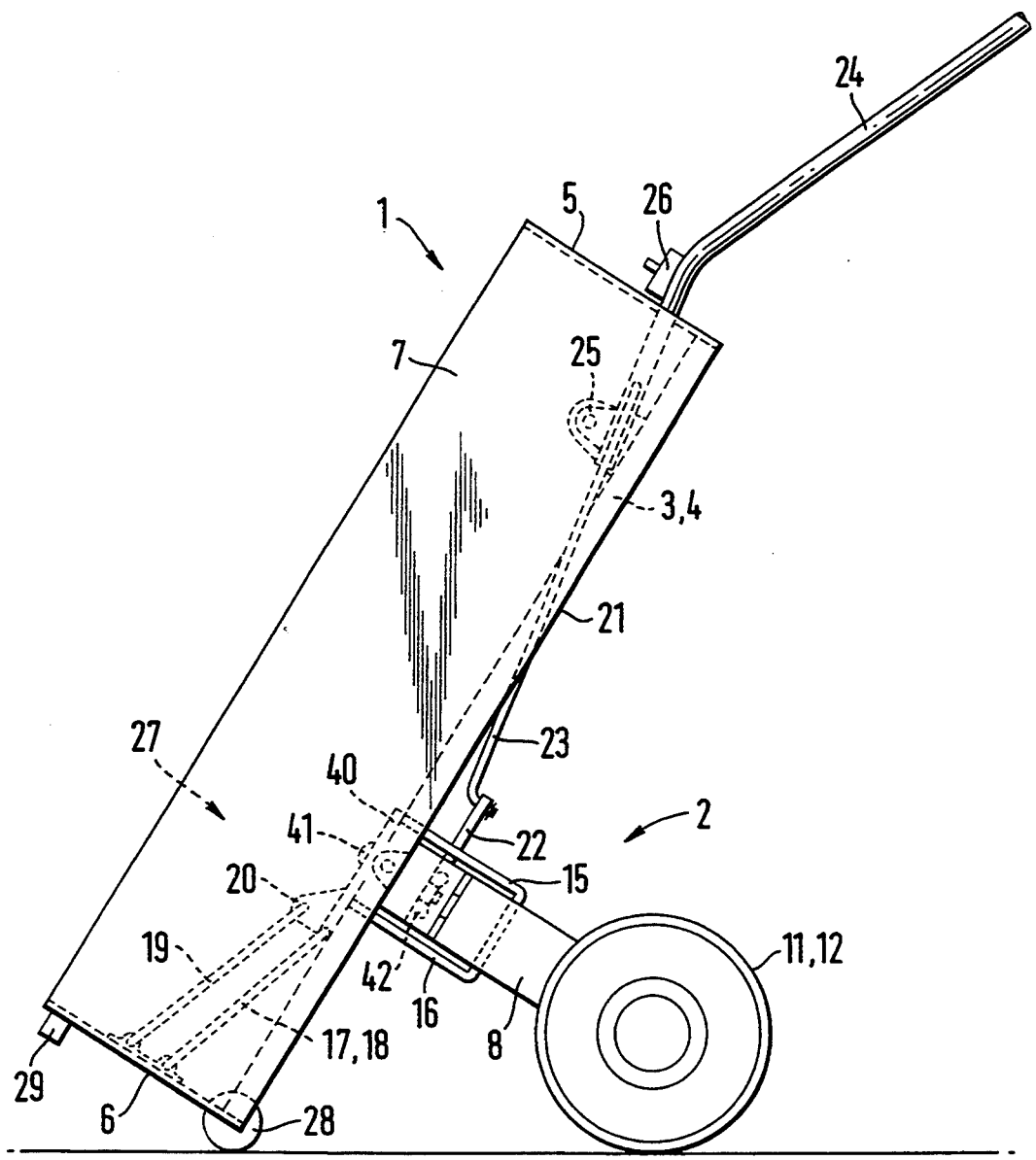
FIG. 1 is a side elevation of a combined golf bag and trolley constructed in accordance with one embodiment of the invention and illustrating the trolley in its operative position.

Referring to the drawings, a combined golf bag and trolley comprises an elongated bag 1 and a collapsible trolley 2. The bag 1 has an open upper end and a closed lower end and comprises two parallel, spaced, longitudinally extending frame members 3,4, for example made from aluminium tubes, an upper transverse plate member 5 and a lower rigid plate member 6 closing its lower end. A frame member 7 having a C-shaped cross-section and being made from any suitable material, for example rigid plastics sheet, such as polypropylene, joins the four frame members 3-6 together to form a tubular shaped bag. The whole framework is then covered in suitable sheeting material (not shown) which is connected, for example by rivets, to the upper and lower plate members 5,6. The upper plate member 5 is appropriately provided with a plurality of holes (not shown) to accommodate different golf clubs.

Figure 5:
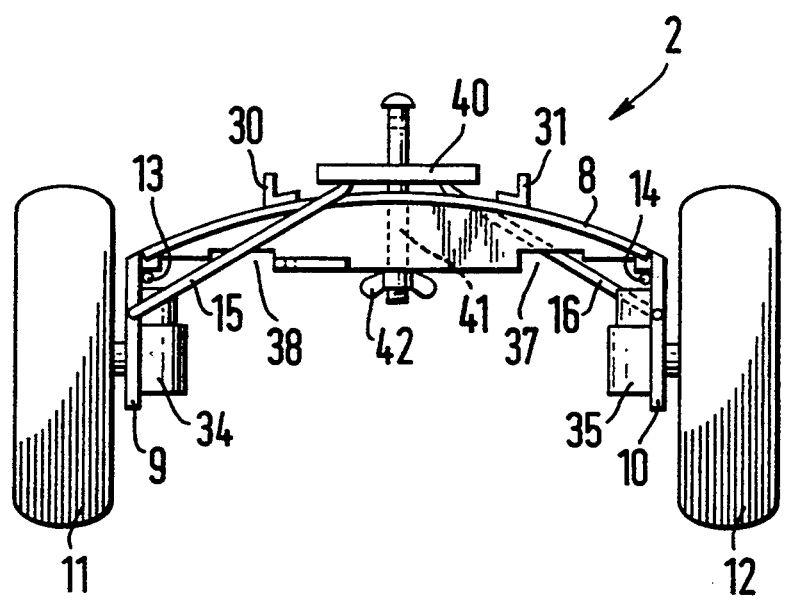
FIG. 5 is a fragmentary view illustrating a front elevation of the trolley with the wheels unfolded for use.
Figure 6:
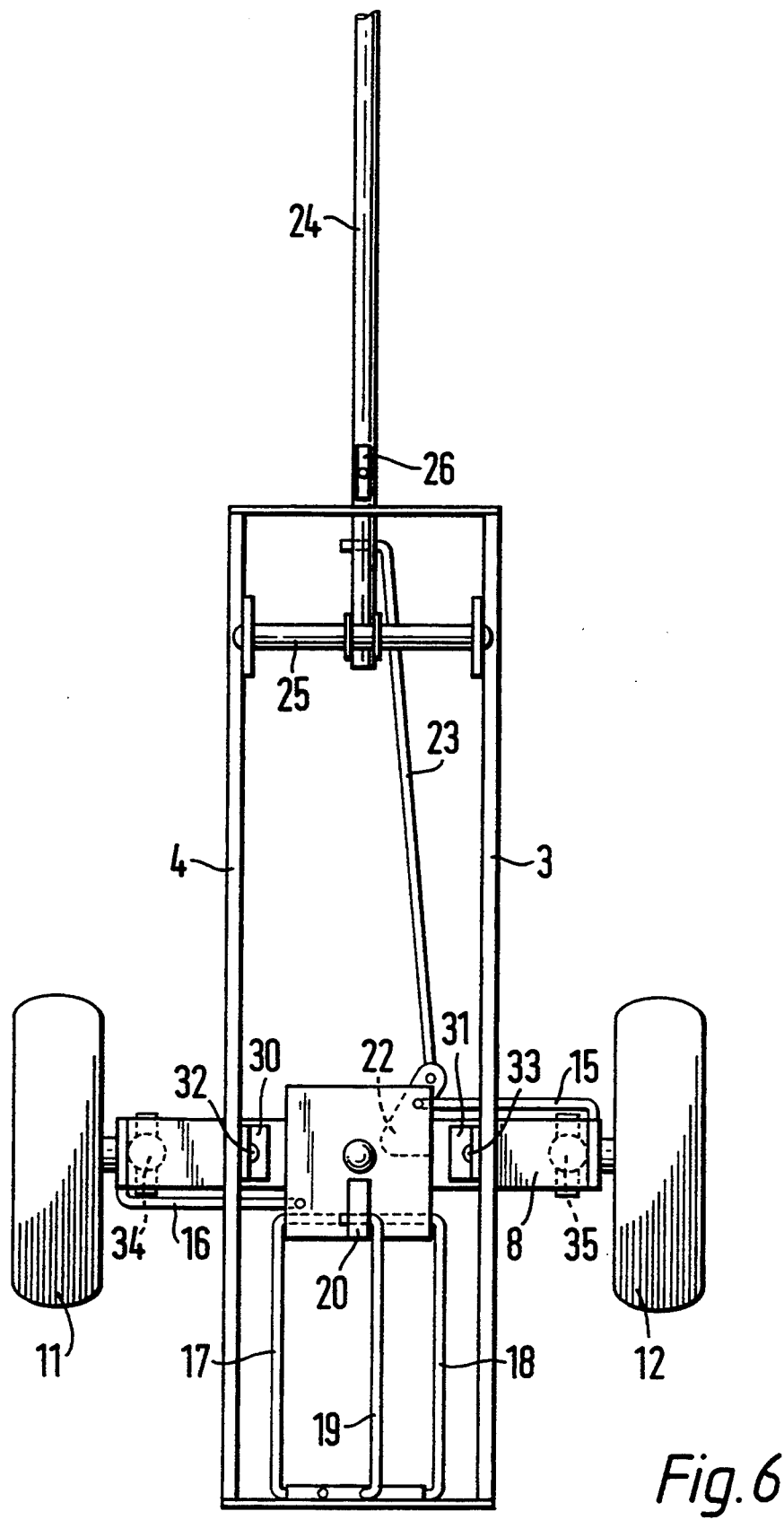
FIG. 6 illustrates a view from the inside of the bag in the direction of the rear of the bag.

As shown in FIG. 5, the trolley 2 comprises an elongated arch-shaped brace 8 forming an undercarriage, and a pair of foldable legs 9,10 mounting a pair of wheels 11,12, the legs being hinged to opposite ends of the brace 8 by hinges 13,14 such that the wheels in their open position, as shown in FIG. 5, are positioned outside of the brace 8 with the brace being located therebetween. The wheel brace 8 is pivotally connected to a plate 40 by a bolt 41 and a butterfly nut 42, and a pivotal strut assembly interconnects the plate 40 with the foldable legs and a handle 24, and the bag plate member 6. The strut assembly comprises two struts 15,16 pivotally connected at one of their ends to the plate 40 and at their other ends to the foldable legs 9,10 respectively, with one strut extending along one side of the wheel brace 8 and the other strut extending along the other side of the brace as best shown in FIG. 6. The lower end of the plate 40 is coupled to the lower plate member 6 by three pivotal spring-biassed struts 17,18,19. The two struts 17,18 lie in substantially the same plane transverse to the longitudinal axis of the bag and the third strut 19 is pivotally connected to a projecting flange 20 of the plate 40 and is located above and between the other two struts to inhibit twisting movement of the plate 40, thereby ensuring that the trolley 2 is maintained, in its operative position, substantially parallel to adjacent side 21 of the bag. A further plate 22 is pivotally connected to the wheel brace 8 at a position offset from the pivotal axis of the brace formed by the bolt 10, and another strut 23 is pivotally connected at its lower end to the plate 22 and at its upper end to the handle 24. The handle, in turn, is pivotally mounted on a bracket 25 projecting into the interior of the bag and joining the two frame members 3,4, as shown in FIG. 6. A latching mechanism 26 is provided on the handle 24 for latching the handle to the upper plate member 5 to retain the handle in its generally upright position.

Figure 2:
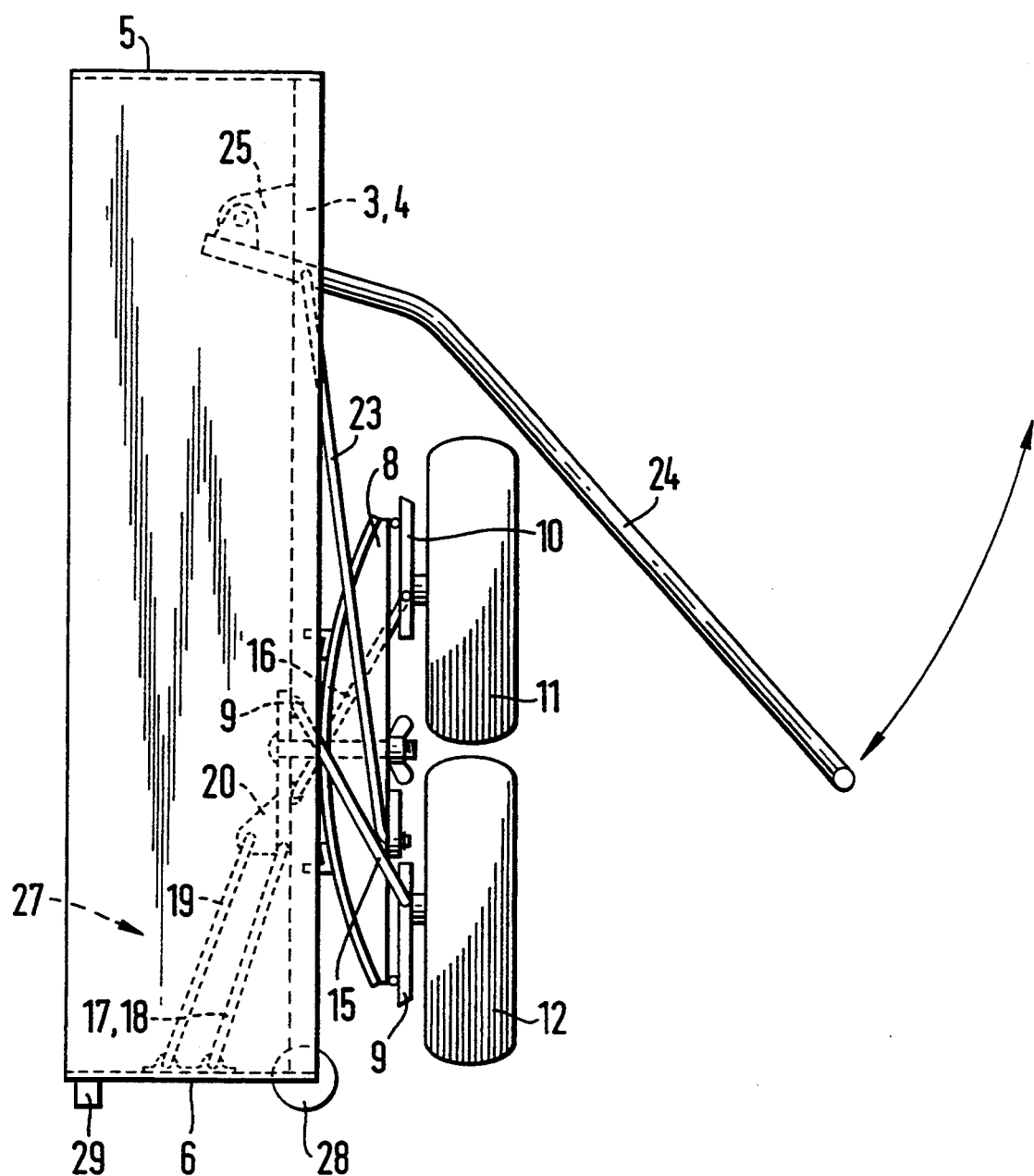
FIG. 2 is a side elevation of the embodiment shown in FIG. 1 and illustrating the trolley swiveled into its inoperative position preparatory to being stowed.

As shown in FIGS. 2 and 3, a cavity 27, formed between the frame member 3,4, is provided within the confines of the bag 1 adjacent its lower end, for stowing the undercarriage when collapsed and turned as described hereinafter so as to extend parallel to the bag. In this position, the undercarriage is movable between the spaced frame members 3,4 and into and out of the cavity 27 through an opening in the skin wall of the bag disposed in the adjacent side 21 of the bag.

The bag has castors 28, and an end butt 29 at its lower end, and a detachable carrying strap (not shown). The interior of the bag may be provided with a multiplicity of longitudinally extending tubes forming individual compartments for the shafts of golf clubs carried in the bag.

The combined bag and trolley operates in the following way. When required for use, the handle 24 is pivoted upwards from the stowed-away position shown in FIG. 3. As this is carried out, the strut 23 is swung out of the bag to the position shown in FIG. 2, which causes the struts 17,18,19, which are spring-biassed, to over-centre by pivoting towards the frame members 3,4. This in turn causes the wheel brace 8 and wheels 11,12 to be pushed out between the frame members 3,4 as also shown in FIG. 2. As the handle 24 is lifted further, the wheel brace 8 is rotated through 90° about its pivotal connection relative to the plate 40 by further upward movement of the strut 23, which in turn causes the wheel struts 15,16 to hinge the legs 9,10 outwardly until the wheels 11,12 are in their operative position as shown in FIG. 5. When the turning of the wheel brace 8 is complete, hooks 30,31 mounted on the upper surface of the wheel brace 8 locate around lugs 32,33 provided on the inner faces of the frame members 3,4, thereby retaining the trolley 2 in its operative position. The handle 24 is also latched by mechanism 26 to hold the trolley securely in its operative position. The combined bag and trolley is now ready for use and may stand upright when not held by the handle 24, by being supported by the tripod arrangement formed by the two wheels 11,12 and the castors 28, in contact with the ground, as shown in FIG. 1.

In order to collapse the combined bag and trolley the handle 24 is unlatched and pivotally lowered to its stowed-away position. This action on the handle causes the undercarriage to swivel back to its inoperative position, which folds the wheels, and the spring-biassed struts 17,18,19 to over-centre back into the bag thereby pulling the whole undercarriage into the bag recess 27. When in the stowed position, the outside surfaces of the wheels 11,12 are substantially flush with the adjacent flat side 21 of the bag so as to form a streamlined unit for storage or transportation, as shown in FIGS. 3 and 4. When collapsed, the trolley 2 may be retained in the recess 27 by any suitable means, for example, a zip up fabric panel or velcro securing straps.

A retaining strap (not shown), which may be made for example of webbing, is preferably provided between the plate 40 and the upper plate member 5 so as to retain the plate 40 within the bag and to prevent the undercarriage from falling away from the bag. The trolley 2 may be detached from the plate 40 by removing the nut and bolt 40,41, so that the bag 1 may be carried, for example by a shoulder strap (not shown).

The combined golf bag and trolley may be motorised, for example, by the provision of two small motors 34,35 mounted on the wheel axes. Power may be transmitted from a rechargeable battery (not shown) or other power source to the motors, which may be driven independently or in unison, by a suitable control device or switching apparatus (not shown) provided on the handle 24. The control device or switching apparatus may be operable so as to cause driving of the wheels in forward or reverse directions and at variable speeds. Recesses 37,38 may be formed in the lower surface of the brace 8 in order to accommodate the motors when the wheels are folded.

The bag 1 may be provided with a lid (not shown), which when open is a convenient receptacle for holding small items, for example golf balls, jumpers, gloves, etc.

It can be seen, in particular from FIG. 3, that the pivotal connection of the handle 24 to the bracket is offset relative to the pivotal connection of the strut 23 to the handle, and the pivotal connection of the lower end of the strut 23 to the plate 22 is substantially in line with respect to the pivotal connection of the handle 24 to the bracket. This arrangement enables the handle to be located further inside the bag in its stowed-away position and further outside the bag when in its operative position. By virtue of the rotation of the wheel brace 8, the diagonal wheel struts 15,16 hold the legs 9,10 fully open and will not close them in against the brace 8 until the wheel brace is swiveled back to its inoperative position by lowering of the handle.

It will be understood that modifications to the embodiments particularly described are possible within the scope of the invention as defined in the appended claims. For example, the undercarriage wheel brace 8 may be provided with grooves or flanges for assisting the correct alignment of the trolley 2 with the frame members 3,4. Also the hinges 13,14 may be formed by suitable parts of flexible plastics. The castors 28 may be replaced by a roller which is less prone to becoming clogged with dirt, etc., during use. In a modification of the invention the described embodiments may be readily adapted for carrying other items such as surfboards and sailboards, instead of golf clubs.

We claim:

1. A combined bag and trolley comprising:
   (a) an elongated bag structure having a longitudinal axis and a cavity in an underside of said bag structure between opposite ends thereof,
   (b) a trolley adjacent said cavity and comprising an undercarriage having a pair of wheels, said wheels being mounted on said undercarriage by hinged means such that said wheels are foldable upwardly on said hinged means when not in use,
   (c) mounting means attaching said undercarriage to said bag structure and including pivot means pivotally mounting said undercarriage for turning movement relatively to said bag structure about a pivot axis transverse to said longitudinal axis of said bag structure, whereby said undercarriage can be swiveled between an operative position, in which the rotational axes of said wheels extend transversely to said longitudinal axis of said bag structure to permit movement of said bag structure on said wheels, and an inoperative position in which said rotational axes of said wheels extend substantially in the same direction as said longitudinal axis of said bag structure,
   (d) said mounting means being movable to stow said undercarriage and folded wheels within said cavity when said undercarriage is swiveled into said inoperative position and said wheels are folded upwardly, and
   (e) said cavity being sufficiently deep to house said undercarriage and folded wheels substantially within the confines of said cavity.

2. The combined bag and trolley claimed in claim 1, wherein said bag structure includes spaced frame members extending longitudinally of said bag structure along opposite sides of said cavity therein, and said undercarriage and folded wheels are movable into said cavity between said frame members.

3. The combined bag and trolley claim 1, wherein said mounting means comprises strut means connecting said pivot means to said bag structure, said strut means being pivotally connected to said pivot means and said bag structure for moving said undercarriage and folded wheels into and out of said cavity when in said inoperative position.

4. The combined bag and trolley claimed in claim 1, wherein said mounting means comprises pivoted struts interconnecting said pivot means and said hinged means, whereby swiveling of said undercarriage into said inoperative position folds said wheels and swivelling of said undercarriage into said operative position unfolds said wheels.

5. The combined bag and trolley claimed in claim 4, further comprising a pivoted handle for propelling said bag structure on said trolley when said undercarriage is in said operative position, and means connecting said pivoted handle to said undercarriage such that pivotally lowering said handle swivels said undercarriage into said inoperative position, folds said wheels and stows said undercarriage and folded wheels within said cavity, and pivotally lifting said handle reverses the procedure to deploy said undercarriage from said cavity and into said operative position.

6. The combined bag and trolley claimed in claim 5, wherein a latching mechanism is provided to latch said handle in its pivotally lifted position.

7. The combined bag and trolley claimed in claim 1, wherein said undercarriage comprises an arch shaped wheel brace and said wheels are attached to said brace by legs hinged to opposite ends of said brace, whereby said wheels are adapted to be folded upwardly and inwardly in said inoperative position substantially parallel to the underside of said brace.

8. The combined bag and trolley claimed in claim 1, wherein said pivot means is a releasable pivot means enabling said undercarriage to be detached from said bag.

9. The combined bag and trolley claimed in claim 1, further comprising motor drive means for driving said wheels.

10. The combined bag and trolley claimed in claim 9, wherein said motor drive means comprises at least one electrical drive motor coupled to at least one of said wheels and a rechargeable battery as a source of electrical power for said at least one motor.

11. The combined bag and trolley claimed in claim 9, wherein said motor drive means comprises an electrical drive motor mounted on each wheel such that said motors may be independently controlled.

12. A combined bag and trolley comprising:

(a) an elongated bag structure having a longitudinal axis and a cavity in an underside of said bag structure between opposite ends thereof, (b) a trolley adjacent said cavity and comprising an undercarriage having a pair of wheels, said wheels being mounted on said undercarriage by hinged means such that said wheels are foldable upwardly on said hinged means when not in use.

(c) mounting means pivotally mounting said undercarriage to said bag structure for turning movement relatively to said bag structure about a pivot axis transverse to said longitudinal axis of said bag structure, whereby said undercarriage can be swiveled between an operative position, in which the rotational axes of aid wheels extend transversely to said longitudinal axis off said bag structure to permit movement of said bag structure on said wheels, and an inoperative position in which said rotational axes of said wheels extend substantially in the same direction as said longitudinal axis of said bag structure, (d) said mounting means being movable to stow said undercarriage and folded wheels within said cavity when said undercarriage is swiveled into said inoperative position and said wheels are folded upwardly, (e) said cavity being sufficiently deep to house said undercarriage and said folded wheels substantially within the confines of said cavity, and (f) a handle for propelling said bag structure on said trolley when said undercarriage is in said operative position, said handle being pivoted to said bag structure and being pivotally connected to a pivotal strut assembly associated with said mounting means, said strut assembly being arranged such that pivotal lifting of said handle deploys said undercarriage from said cavity, swivels said undercarriage to said operative position and unfolds said wheels, and pivotal lowering of said handle reverses the procedure to restow said undercarriage in said cavity.

13. The combined bag and trolley claimed in claim 12, wherein a latching mechanism is provided to latch said handle in its pivotally lifted position.

14. The combined bag and trolley claimed in claim 12, wherein said strut assembly includes at least one strut coupling said undercarriage to said bag structure, said at least one strut being pivotally connected to said bag structure, and said at lest one strut extending in the direction of said longitudinal axis of said bag structure and being swingable in a direction transverse to said longitudinal axis so as to control movement of said undercarriage into and out of said cavity.

15. The combined bag and trolley claimed in claim 14, wherein said at least one strut is spring biased about said pivotal connection thereof in a direction to urge said undercarriage from cavity.

16. The combined bag and trolley claimed in claim 14, wherein said mounting means includes a plate member to which said undercarriage is pivotally connected and said at least one strut is pivotally connected to said plate member.

17. The combined bag and trolley claimed in claim 16, wherein said strut assembly includes second struts respectively connecting said hinged means to said plate member and a third strut pivotally connecting said handle to said undercarriage, said third strut being pivoted to said undercarriage in offset relation with respect to the pivot axis of said pivotal connection between said undercarriage and said plate member and being pivoted to said handle in offset relation with respect to the handle pivot.

18. A combined golf bag and trolley comprising:

(a) an elongated bag having a longitudinal axis and an open upper end and a closed bottom end, said bag structure having a cavity in an underside of said bag between said upper and bottom ends thereof and extending along said bag from adjacent said bottom end, (b) a trolley adjacent said cavity and comprising an undercarriage having a pair of wheels, said wheels being mounted on said undercarriage by hinged legs extending downwardly with respect to said undercarriage, and said wheels being foldable upwardly on said hinged legs when not in use.

(c) mounting means attaching said undercarriage to said bag structure at a location within said cavity and including pivot means pivotally mounting said undercarriage for turning movement relatively to said bag structure about a pivot axis transverse to said longitudinal axis of said bag structure, whereby said undercarriage can be swiveled between an operative position, in which the rotational axes of said wheels are coaxial and extend transversely to said longitudinal axis of said bag structure to permit movement of said bag structure on said wheels, and an inoperative position in which said rotational axes of said wheels extend substantially in the same direction as the longitudinal axis of said bag structure, (d) said mounting means being movable to stow said undercarriage and folded wheels within said cavity when said undercarriage is swiveled into said inoperative position and said wheels are folded upwardly, (e) said cavity being sufficiently deep so as to house said undercarriage and said folded wheels substantially within the confines of said cavity, (f) a handle projecting beyond the upper end of said bag structure for propelling said bag structure on said trolley when said undercarriage is deployed in said operative position, said handle being pivoted to said bag structure, (g) pivoted struts interconnecting said handle and said undercarriage and said mounting means and said hinged legs, whereby pivotally lowering said handle swivels said undercarriage into said inoperative position, folds said wheels and moves said mounting means to stow said undercarriage and folded wheels within said cavity, and pivotally lifting said handle reverses the procedure to deploy said undercarriage from said cavity and into said operative position, (h) said bag structure, when stationary within said undercarriage in said operative position, being supportable in a generally upright position by a tripod arrangement formed by the bottom end of said bag and said wheels to facilitate access to golf clubs projecting from said open upper end of said bag structure.

19. The combined golf bag and trolley claimed in claim 18, wherein said upper end of said bag structure is provided with a cover for closing said upper end of said bag structure and protecting golf clubs contained therein.

20. The combined gold bag and trolley claimed in claim 18, wherein said cavity is provided with a closeable cover for enclosing said cavity when said undercarriage and folded wheels are stowed in said cavity.

* * * * *